United States Patent
Kim et al.

(10) Patent No.: US 8,046,725 B2
(45) Date of Patent: Oct. 25, 2011

(54) METHOD OF INCREMENTAL STATISTICAL STATIC TIMING ANALYSIS BASED ON TIMING YIELD

(75) Inventors: Jinwook Kim, Seongnam Si (KR);
Young Hwan Kim, Pohang Si (KR);
Wook Kim, Pohang Si (KR)

(73) Assignee: Postech Academy-Industry Foundation, Pohang, Kyungsanbuk-do (KR)

( * ) Notice: Subject to any disclaimer, the term of this patent is extended or adjusted under 35 U.S.C. 154(b) by 333 days.

(21) Appl. No.: 12/475,545

(22) Filed: May 31, 2009

(65) Prior Publication Data

US 2010/0306724 A1 Dec. 2, 2010

(30) Foreign Application Priority Data

May 26, 2009 (KR) ........................ 10-2009-0046079

(51) Int. Cl.
*G06F 9/455* (2006.01)
*G06F 17/50* (2006.01)

(52) U.S. Cl. ........ 716/108; 716/110; 716/111; 716/112; 716/113; 716/134; 703/19

(58) Field of Classification Search ................... 716/56, 716/106, 108, 110–113, 132, 134; 703/19
See application file for complete search history.

(56) References Cited

U.S. PATENT DOCUMENTS

| 7,000,205 | B2 * | 2/2006 | Devgan et al. ................. 716/113 |
| 7,861,199 | B2 * | 12/2010 | Visweswariah et al. ....... 716/113 |
| 2005/0066296 | A1 * | 3/2005 | Visweswariah .................... 716/6 |
| 2008/0307379 | A1 * | 12/2008 | Visweswariah .................... 716/6 |
| 2009/0013294 | A1 * | 1/2009 | Visweswariah .................... 716/6 |

OTHER PUBLICATIONS

Jin Wook Kim, Wook Kim, Hyoun Soo Park and Young Hwan Kim, Incremental Statistical Static Timing Analysis with Gate Timing Yield Emphasis, IEEE, Dec. 2008, pp. 1016-1019.
C. Visweswariah et al., "First-order incremental block-based statistical timing analysis," IEEE Transactions on Computer-Aided Design of Integrated Circuits and Systems, vol. 25, No. 10, pp. 2170-2180, Oct. 2006.

* cited by examiner

*Primary Examiner* — Paul Dinh
*Assistant Examiner* — Nha Nguyen
(74) *Attorney, Agent, or Firm* — Kile Park Goekjian Reed & McManus PLLC

(57) ABSTRACT

Provided is a method of incremental SSTA (statistical static timing analysis) of a digital circuit, the method including a first step in which, when a gate is replaced in the digital circuit, delay propagation is performed from a node of a replaced gate to a virtual sink node based on SSTA; a second step in which, if a changed value of a gate timing yield at each gate which propagates delay toward the virtual sink node is smaller than a predetermined threshold value, delay propagation with respect to a fanout gate of the corresponding gate is stopped; and a third step in which, when a delay with respect to the node of the replaced gate is propagated to the virtual sink node, a new timing yield is calculated at the virtual sink node.

2 Claims, 4 Drawing Sheets

Circuit timing yield (C432)

Total Error (C432)

METHOD OF INCREMENTAL STATISTICAL STATIC TIMING ANALYSIS BASED ON TIMING YIELD

CROSS-REFERENCE TO RELATED PATENT APPLICATION

This application claims the benefit of Korean Patent Application No. 10-2009-0046079, filed on May 26, 2009, in the Korean Intellectual Property Office, the disclosure of which is incorporated herein in its entirety by reference.

BACKGROUND OF THE INVENTION

1. Field of the Invention

The present invention relates to a method of incremental statistical static timing analysis (SSTA) of a very-large-scale-integration (VLSI) circuit, and more particularly, to a method of incremental SSTA based on a probability statistics method, for effective timing analysis through incremental analysis in the case of optimizing a timing yield and for predicting a timing yield more accurately.

2. Description of the Related Art

In the fabrication of very-large-scale-integration (VLSI) circuits, variations in chip performance become more significant due to variations in the manufacturing process, which increase as fabrication techniques become more intricate, and thus a loss in chip yield becomes a serious problem. To resolve this problem, it is necessary not only to improve fabrication techniques, but also to analyze effects of variations in the manufacturing process with respect to chip performance and consider the effects when a chip is being designed.

As a major analyzing method to analyze effects of variations in the manufacturing process with respect to chip performance, statistical static timing analysis (SSTA) has been suggested. According to the SSTA, timings of a chip are indicated as a probability distribution, and a timing yield, which is a probability that a chip satisfies given timing constraints, is predicted based on the distribution of probabilities.

Analysis of a circuit is repeatedly performed when the circuit is designed and when the circuit is optimized. Thus, it is not efficient to repeat such analysis every time when one or more subtle changes occur in a circuit. A method of incremental analysis, which is suggested as a method for efficient design and optimization of a circuit, is a method that updates results corresponding to only changed portions of a circuit based on previous analysis results when there are subtle changes in the circuit.

Regarding SSTA, a method of tightness probability based incremental analysis (TBIA) using tightness probability, which is a probability that a particular probability variable is greater than other probability variables, is suggested in Reference 1.

[Reference 1] C. Visweswariah, K. Ravindran, K. Kalafala, S. G. Walker, S. Narayan, D. K. Beece, J. Piaget, N. Venkateswaran, and J. G. Hemmett, "First-order incremental block-based statistical timing analysis," IEEE Transactions on Computer-Aided Design of Integrated Circuits and Systems, vol. 25, no. 10, pp. 2170-2180, October 2006.

FIG. 1 is a diagram showing a digital circuit having gates to describe timing analysis, and FIG. 2 is a timing graph with respect to the circuit of FIG. 1.

Timing analysis of a circuit is performed using a timing graph, and primary inputs and primary outputs of the circuit are connected to one virtual source node 100 and one virtual sink node 110, respectively. Thus, the virtual source node 100 is the starting point of all circuit signals, whereas the virtual sink node 110 is the destination point of all circuit signals.

Furthermore, input pins and output pins of the gates are replaced with nodes that correspond to each respective pin. Signal paths from the input pins to the output pins of the gates are connected by edges, and a weight of an edge indicates a delay of a corresponding path. Interconnection between the gates and delays of the interconnection are also replaced with an edge and an edge weight. Numbers 1 through 10 of the input pins and output pins in FIG. 1 correspond to nodes 1 through 10 in FIG. 2, and primary inputs and primary outputs are connected to a virtual source node and a virtual sink node, respectively.

According to static timing analysis, an arrival time at each node is determined by the maximum value of arrival times of all fanin edges in MAX operation. Here, the arrival time is a time period for transmitting a signal from a virtual source node to a node, and an arrival time of an edge can be calculated by adding a delay of the edge to an arrival time of an input node in ADD operation. The arrival time of a node is transmitted to a next node via an output edge, wherein the transmission process is referred as delay propagation.

A required arrival time of a node is a latest arrival time of the node to avoid timing failure, and can be calculated by performing delay propagation backward, that is, from a virtual sink node to a virtual source node, according to timing constraints of a circuit.

According to deterministic static timing analysis, when a gate is replaced, delay is propagated from the replaced gate to a sink node. In a timing graph, arrival time is updated from an edge having a changed edge delay with respect to fanout nodes. Here, even if delays of a part of fanin edges at an arbitrary node is changed, if arrival time of the node is not changed when maximum value the delays is computed, updating arrival times with respect to fanouts of the node may be omitted.

According to statistical static timing analysis, a change in an arrival time of an arbitrary node affects arrival times of all fanout nodes. Thus, for errorless performance of incremental analysis, it is necessary to update arrival times of all fanout gates of a replaced gate. However, it is very inefficient to update a large number of arrival times in this case. Thus, for efficient analysis, if a change of arrival time at the arbitrary node is not significant, delay propagation to fanout gates may be partially omitted regardless of the occurrence of some errors.

According to tightness probability based incremental analysis, when a tightness probability of a changed input delay of a gate is less than a particular threshold value before and after gate replacement, delay propagation from the corresponding gate is stopped, so that efficiency with respect to delay propagation is improved. However, since a timing yield is not directly considered, the timing yield cannot be accurately predicted.

SUMMARY OF THE INVENTION

The present invention provides a method of incremental statistical static timing analysis (SSTA), which defines a timing yield at each gate to consider a timing yield in incremental statistical static timing analysis (SSTA) and determines whether to propagate a delay or not based on a value of a timing yield of a gate changed due to gate replacement, based on a statistics method considering the timing yield for highly accurate timing yield optimization.

According to an aspect of the present invention, there is provided a method of incremental SSTA (statistical static timing analysis) of a digital circuit, the method including a first step in which, when a gate is replaced in the digital circuit, delay propagation is performed from a node of a replaced gate to a virtual sink node based on SSTA; a second step in which, if a changed value of a gate timing yield at each gate which propagates delay toward the virtual sink node is smaller than a predetermined threshold value, delay propagation with respect to a fanout gate of the corresponding gate is stopped; and a third step in which, when a delay with respect to the node of the replaced gate is propagated to the virtual sink node, a new timing yield is calculated at the virtual sink node.

Furthermore, the timing yield of a gate is calculated according to an equation $$\text{Gate Timing Yield} = \Phi\left(\frac{\mu_i}{\sigma_i}\right),$$

where $\Phi$ indicates a cumulative distribution function of a standard normal distribution, and $\mu_i$ and $\sigma_i$ indicate a mean deviation and a standard deviation of timing slack at an arbitrary gate i.

Furthermore, the predetermined threshold value is set based on an allowable maximum error value of a timing yield in the digital circuit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

For efficient timing yield optimization when gate replacement occurs, a method of incremental statistical static timing analysis (SSTA) is required.

First, an SSTA applied to the present invention will be described below.

Figure 1:
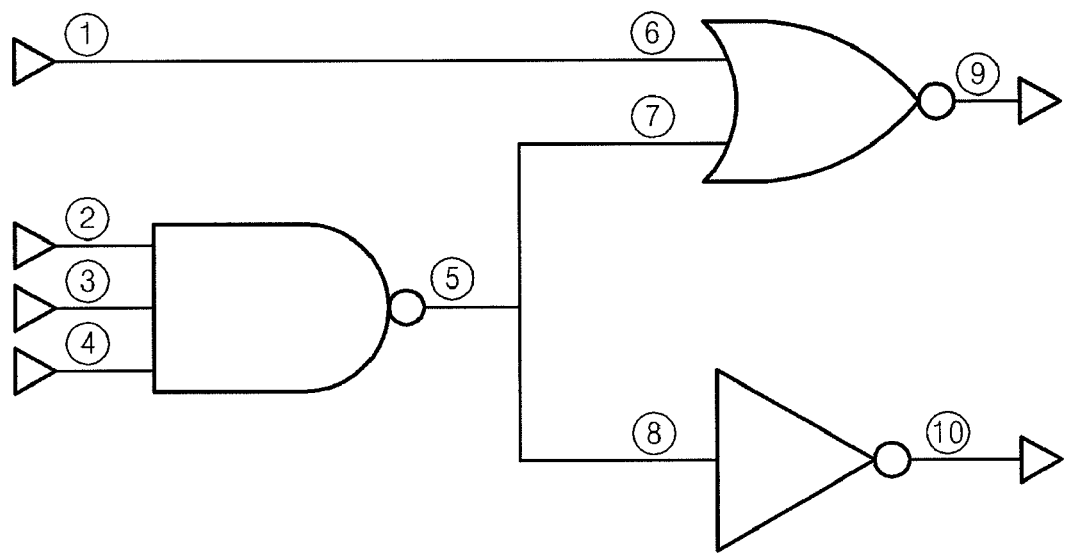
FIG. 1 is a diagram showing a digital circuit formed of gates to describe timing analysis.
Figure 2:
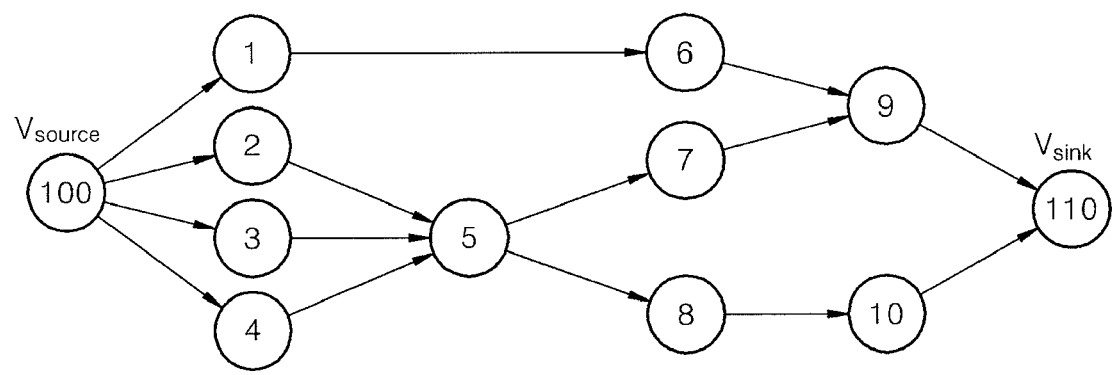
FIG. 2 is a timing graph with respect to the circuit of FIG. 1
Figure 3:
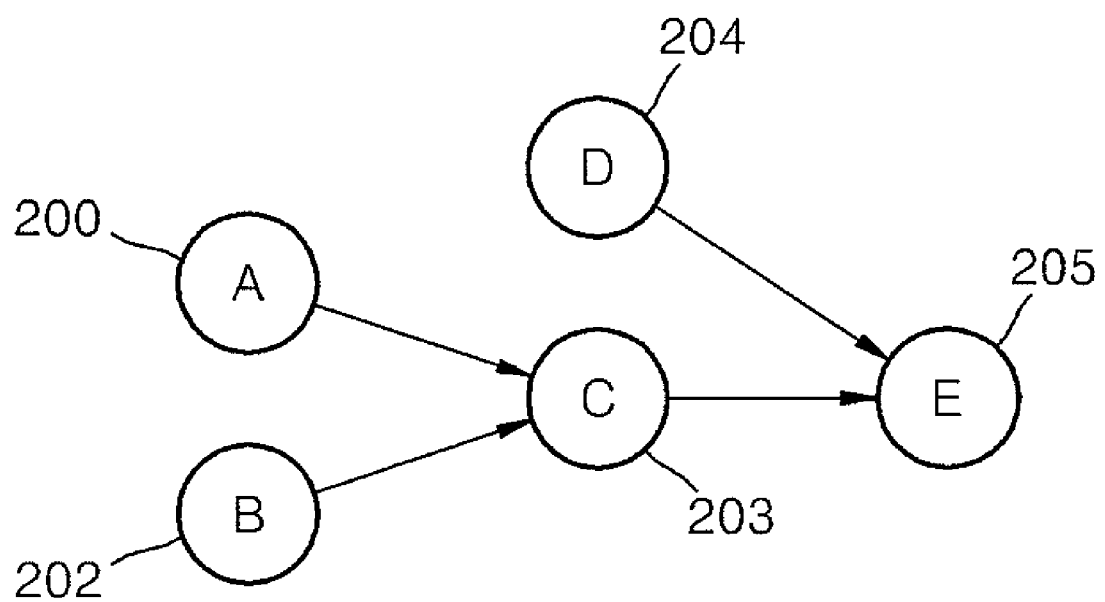
FIG. 3 is a timing graph for describing a method of statistical static timing analysis (SSTA) applied to the present invention.

FIG. 3 is a timing graph for describing a method of SSTA applied to the present invention.

Each of nodes 200 through 205 corresponds to each of arrival times A through E that are time variables at a corresponding node. In FIG. 3, it is assumed that the node 205 is a virtual sink node.

In a first-order block-based SSTA, delays in a circuit are indicated in normal first-order form having a normal distribution as shown in Equation 1.

$$a_0 + \sum_{i=1}^{n} a_i \cdot \Delta X_i + a_{n+1} \cdot \Delta R_a \qquad \text{[Equation 1]}$$

Here, $a_0$ indicates the mean arrival time obtained from mean values of process parameters, $\Delta X_i$ (i=1, 2, ..., n) indicates a variation of the global parameter $X_i$ (i=1, 2, ..., n), and $a_i$ (i=1, 2, ..., n) indicates delay sensitivity of $\Delta X_i$. $\Delta R_a$ indicates a variation from the mean value of the independent random variable $R_a$, and $a_{n+1}$ indicates delay sensitivity with respect to $\Delta R_a$. At this point, $\Delta X_i$ (i=1, 2, ..., n) and $\Delta R_a$ have standard normal distributions.

Delays of each of nodes and each of edges in a digital circuit having the structure definition shown in Equation 1 propagate from a virtual source node to a virtual sink node by using an ADD operation and a MAX operation that are defined in block-based SSTA.

The ADD operation and the MAX operation can be expressed as shown in Equation 2 using the arrival times A, B, and C at the nodes 200, 202, and 204, respectively.

$$A = a_0 + \left(\sum_{i=1}^{n} a_i \cdot \Delta X_i\right) + a_{n+1} \cdot \Delta R_a \qquad \text{[Equation 2]}$$

$$B = b_0 + \left(\sum_{i=1}^{n} b_i \cdot \Delta X_i\right) + b_{n+1} \cdot \Delta R_b$$

$$C = c_0 + \left(\sum_{i=1}^{n} c_i \cdot \Delta X_i\right) + c_{n+1} \cdot \Delta R_c$$

The ADD operation performed on two random variables having standard normal distributions generates another random variable having a standard normal distribution. If the arrival time C is generated by performing the ADD operation on the arrival times A and B, C=ADD(A, B) as shown in Equation 3.

$$c_i = a_i + b_i, \; i=0, 1, \ldots, n$$

$$c_{n+1} = \sqrt{a_{n+1}^2 + b_{n+1}^2} \qquad \text{[Equation 3]}$$

Variances of the arrival times A and B shown in Equation 2, which are $\sigma_A^2$ and $\sigma_B^2$, can be obtained according to Equation 4 below.

$$\sigma_A^2 = \sum_{i=1}^{n+1} a_i^2, \; \sigma_B^2 = \sum_{i=1}^{n+1} b_i^2 \qquad \text{[Equation 4]}$$

Furthermore, a correlation coefficient between the arrival times A and B can be expressed as shown in Equation 5 below.

$$\rho = \frac{\sum_{i=1}^{n} a_i b_i}{\sigma_A \sigma_B} \quad \text{[Equation 5]}$$

For the MAX operation to be performed on the arrival times A and B, that is, calculation of MAX(A, B), calculations of $T_A$ and $T_B$, which are tightness probabilities of the arrival times A and B, should be performed in advance. $T_A$ indicates a probability that the arrival time A is later than the arrival time B, whereas $T_B$ indicates a value obtained by subtracting $T_A$ from 1. The probability $T_A$ can be calculated as shown in Equation 6.

$$T_A = \int_{-\infty}^{\infty} \frac{1}{\sigma_A} \phi\left(\frac{x-a_0}{\sigma_A}\right) \Phi\left(\frac{\left(\frac{x-b_0}{\sigma_B}\right) - \rho\left(\frac{x-a_0}{\sigma_A}\right)}{\sqrt{1-\rho^2}}\right) \quad \text{[Equation 6]}$$
$$= \Phi\left(\frac{a_0 - b_0}{\theta}\right)$$

where, $$\phi(x) \equiv \frac{1}{\sqrt{2\pi}} \exp\left(-\frac{x^2}{2}\right)$$

$$\Phi(y) \equiv \int_{-\infty}^{y} \phi(x)\,dx$$

$$\theta \equiv (\sigma_A^2 + \sigma_B^2 - 2\rho\sigma_A\sigma_B)^{\frac{1}{2}}$$

The mean value $\mu_{max}$ and distribution $\sigma_{max}^2$ of two random variables having normal distributions can be expressed as shown in Equations 7 and 8 below.

$$\mu_{max} = a_0 T_A + b_0 T_B + \theta\phi\left(\frac{a_0 - b_0}{\theta}\right) \quad \text{[Equation 7]}$$

$$\sigma_{max}^2 = (\sigma_A^2 + a_0^2)T_A + (\sigma_B^2 + b_0^2)T_B + \quad \text{[Equation 8]}$$
$$(a_0 + b_0)\theta\phi\left(\frac{a_0 - b_0}{\theta}\right) - \mu_{max}^2$$

A result of the MAX operation performed on two random variables having normal distributions is not a perfectly normal distribution. However, a result of the MAX operation is approximated via moment matching like as normal distribution for delay propagation in a timing graph diagram. C=MAX(A, B) is as shown in Equation 9 below.

$$c_0 = \mu_{max} \quad \text{[Equation 9]}$$
$$c_i = a_i T_A + b_i T_B,$$
$$c_{n+1} = \sqrt{\sigma_{max}^2 - \sum_{i=1}^{n} c_i^2}$$
$$i = 1, 2, \ldots, n$$

As shown in Equation 9, the mean value of MAX(A, B) is maintained even if a result of MAX(A, B) is converted into a normal form. Then, a random variable $C_i$ (i=1, 2, ..., n) is obtained based on a ratio of tightness probabilities of $a_i$ to $b_i$. Finally, the delay sensitivity $C_{n+1}$ of an independent random variable can be obtained by matching a variance obtained from the normal first-order form to a variance obtained according to Equation 8.

For accurate incremental SSTA, timing information of all fanout gates from a replaced gate to a virtual sink node is updated. A method of incremental SSTA according to the present invention compares a variation in timing yield with respect to a gate to a threshold value, and stops delay propagation with respect to an unnecessary path within an allowance error, for improved efficiency. Here, the timing yield is a probability that timing slack is greater than 0. In this regard, timing yield of a circuit is a probability that timing slack of a virtual sink node is greater than 0 in a timing graph. Timing slack is a margin of delay at a node, defined as the difference between a required arrival time of the node and an arrival time of the node, wherein the required arrival time of the node is a latest arrival time of the node to avoid timing failure. The required arrival time of a node can be calculated by performing backward delay propagation in a direction opposite to a direction of delay propagation according to timing constraints of a circuit and subtracting delays contrary to delay propagation. The timing yield of a gate, which is to be compared with a threshold value, is defined as shown in Equation 10.

$$\text{Gate Timing Yield} = \Phi\left(\frac{\mu_i}{\sigma_i}\right) \quad \text{[Equation 10]}$$

Here, $\Phi$ indicates a cumulative distribution function of a standard normal distribution, and $\mu_i$ and $\sigma_i$ indicate a mean deviation and a standard deviation of timing slack at a random gate i. Thus, the timing yield of a gate indicates a probability that timing slack of the gate is greater than 0. The timing yield of a gate is a probability that timing slacks of fanin gates are all greater than 0, and is a function of the timing yields of the fanin gates. Therefore, if a change in timing yield of a gate in which a change occurred is small, effects of the change of the timing yield of the gate on the timing yield of a fanout gate and timing yield of a circuit are very small. In this case, delay propagation with respect to a fanout gate may be omitted.

In the method of analysis according to the present invention, when a gate is replaced, a changed delay is propagated from the replaced gate to all fanout gates, and timing information with respect to each gate propagating delay is updated. At this point, if a changed value of the timing yield of a gate is smaller than a predetermined threshold value, delay propagation with respect to the fanout gate of the corresponding gate is stopped. A threshold value may be the maximum error value of the timing yield a user set with respect to a general digital circuit.

ISCAS 85 benchmark circuits are used to evaluate usefulness and efficiency of the method of the present invention. A cell library for mapping the benchmark circuits is set based on 65 nm process model of a predictive technology model (PTM) and in consideration of variations of process parameters such as channel length of a transistor, oxide thickness, and threshold voltage. It is assumed that each of the considered process parameters has a normal distribution. Efficiency and accuracy of omitting a path for delay propagation are compared by performing random gate replacement 100,000 times with respect to each of the ISCAS 85 benchmark circuits. A method used for the comparison is conventional tightness probability based incremental analysis, and a method of updating timing information with respect to all fanout gates to evaluate errors. The efficiency of comparing a method of analysis according to the present invention and a conventional method of analysis is defined as shown in Equation 11.

$$\text{Efficiency} = \frac{N_E - N}{N_E} \quad \text{[Equation 11]}$$

Here, $N_E$ indicates a number of updating all fanout gates according to a method of accurately updating the fanout gates, and N indicates the number of updates with respect to fanout gates in each incremental timing yield analysis method. Thus, efficiency increases as a value for efficiency is closer to 1. For accuracy of the comparison, absolute values of relative errors are used as errors. Since not only the accuracy of the timing yield of a circuit, but also the accuracy of timing information at each gate are important for timing yield optimization, a sum of timing yields of all gates and a timing yield error of a circuit are used together to measure a timing yield error of a gate.

In the drawings described below, TBIA indicates experimental results of conventional incremental analysis based on tightness probability, whereas TYIA indicates experimental results of a method of analysis according to the present invention.

Figure 4:
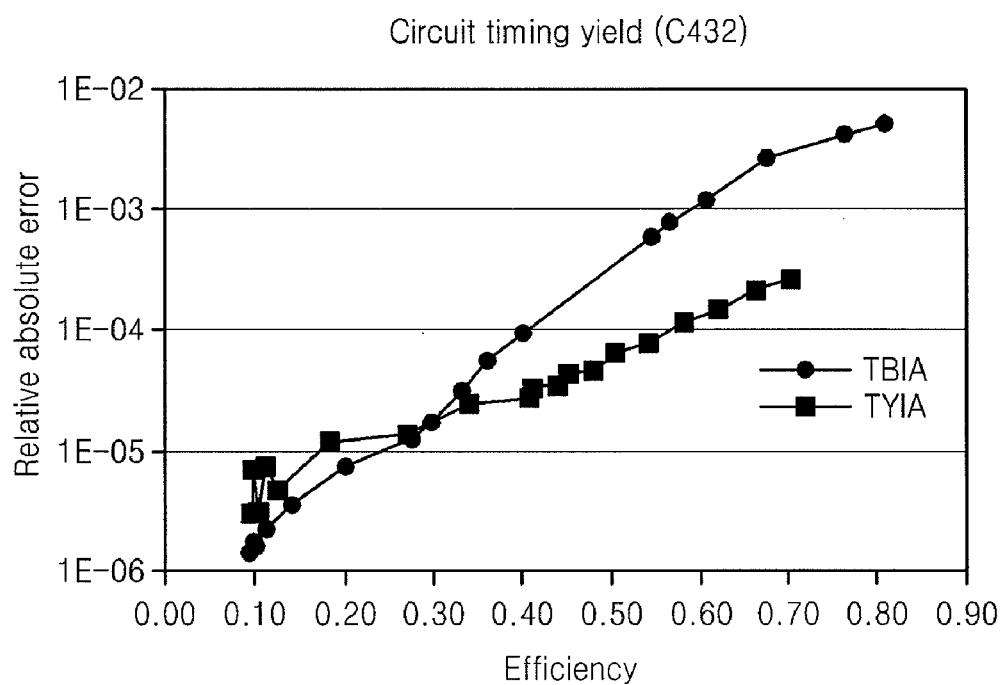
FIG. 4 is a graph showing errors and efficiency of a timing yield of a circuit with respect to a circuit C432 from among the ISCAS 85 benchmark circuits, according to experimental results from a method of incremental analysis based on tightness probability and a method of analysis according to the present invention.

FIG. 4 is a graph showing errors and efficiency of a timing yield of a circuit with respect to a circuit C432 from among the ISCAS 85 benchmark circuits, according to experimental results from the method of incremental analysis based on tightness probability and the method of analysis according to the present invention.

Figure 5:
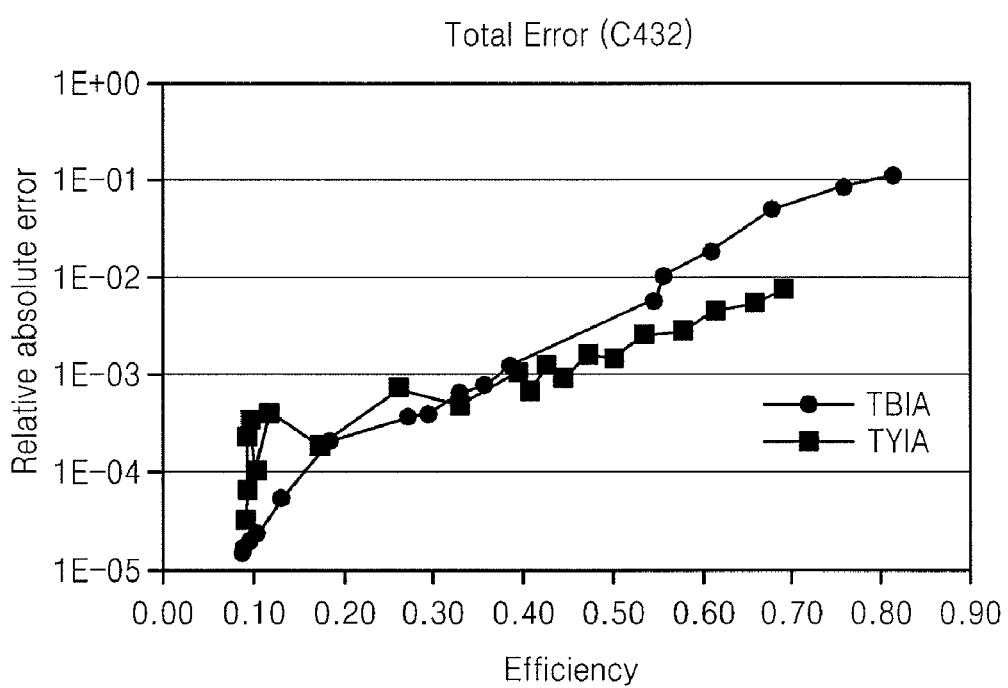
FIG. 5 is a graph showing sum and efficiency of errors of a timing yield of a gate with respect to a circuit C432 from among the ISCAS 85 benchmark circuits, according to experimental results from the method of incremental analysis based on tightness probability and the method of analysis according to the present invention.

FIG. 5 is a graph showing sum and efficiency of errors of a timing yield of a gate with respect to a circuit C432 from among the ISCAS 85 benchmark circuits, according to experimental results from the method of incremental analysis based on tightness probability and the method of analysis according to the present invention.

As shown in FIGS. 4 and 5, when efficiencies are equal to or greater than 0.5, it is clear that the method according to the present invention exhibits fewer errors.

Figure 6:
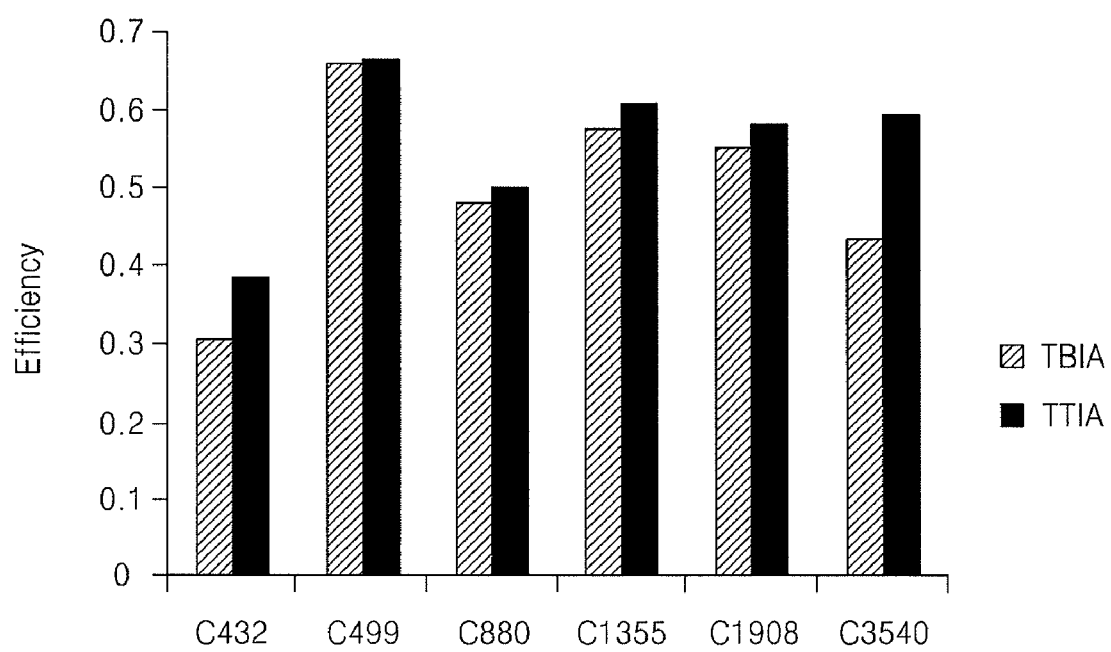
FIG. 6 is a graph showing experimental results with respect to a plurality of the ISCAS 85 benchmark circuits, according to experimental results from the method of incremental analysis based on tightness probability and the method of analysis according to the present invention.

FIG. 6 is a graph showing experimental results with respect to a plurality of the ISCAS 85 benchmark circuits, according to experimental results from the method of incremental analysis based on tightness probability and the method of analysis according to the present invention, indicating efficiencies when a sum of timing yields of gates is $10^{-8}$. As shown in FIG. 6, the method according to the present invention exhibits better efficiency.

As compared to conventional tightness probability based incremental SSTA, a timing yield can be predicted more accurately at a same efficiency according to the method of incremental SSTA, based on the probability statistics method considering the timing yield, according to the present invention.

What is claimed is:

1. A method of incremental SSTA (statistical static timing analysis) of a digital circuit, the method comprising:
   a first step in which, when a gate is replaced in the digital circuit, delay propagation is performed from a node of a replaced gate to a virtual sink node based on SSTA by using a computer;
   a second step in which, when a changed value of a gate timing yield at each gate which propagates delay toward the virtual sink node is smaller than a predetermined threshold value, delay propagation with respect to a fanout gate of the corresponding gate is stopped;
   a third step in which, when a delay with respect to the node of the replaced gate is propagated to the virtual sink node, a new timing yield is calculated at the virtual sink node; and
   wherein the timing yield of a gate is calculated according to an equation $$\text{Gate Timing Yield} = \Phi\left(\frac{\mu_i}{\sigma_i}\right),$$

wherein $\Phi$ indicates a cumulative distribution function of a standard normal distribution, and $\mu_i$ and $\sigma_i$ indicate a mean deviation and a standard deviation of timing slack at an arbitrary gate i.

2. The method of claim 1, wherein the predetermined threshold value is set based on an allowable maximum error value of a timing yield in the digital circuit.

* * * * *